Patented Feb. 6, 1951

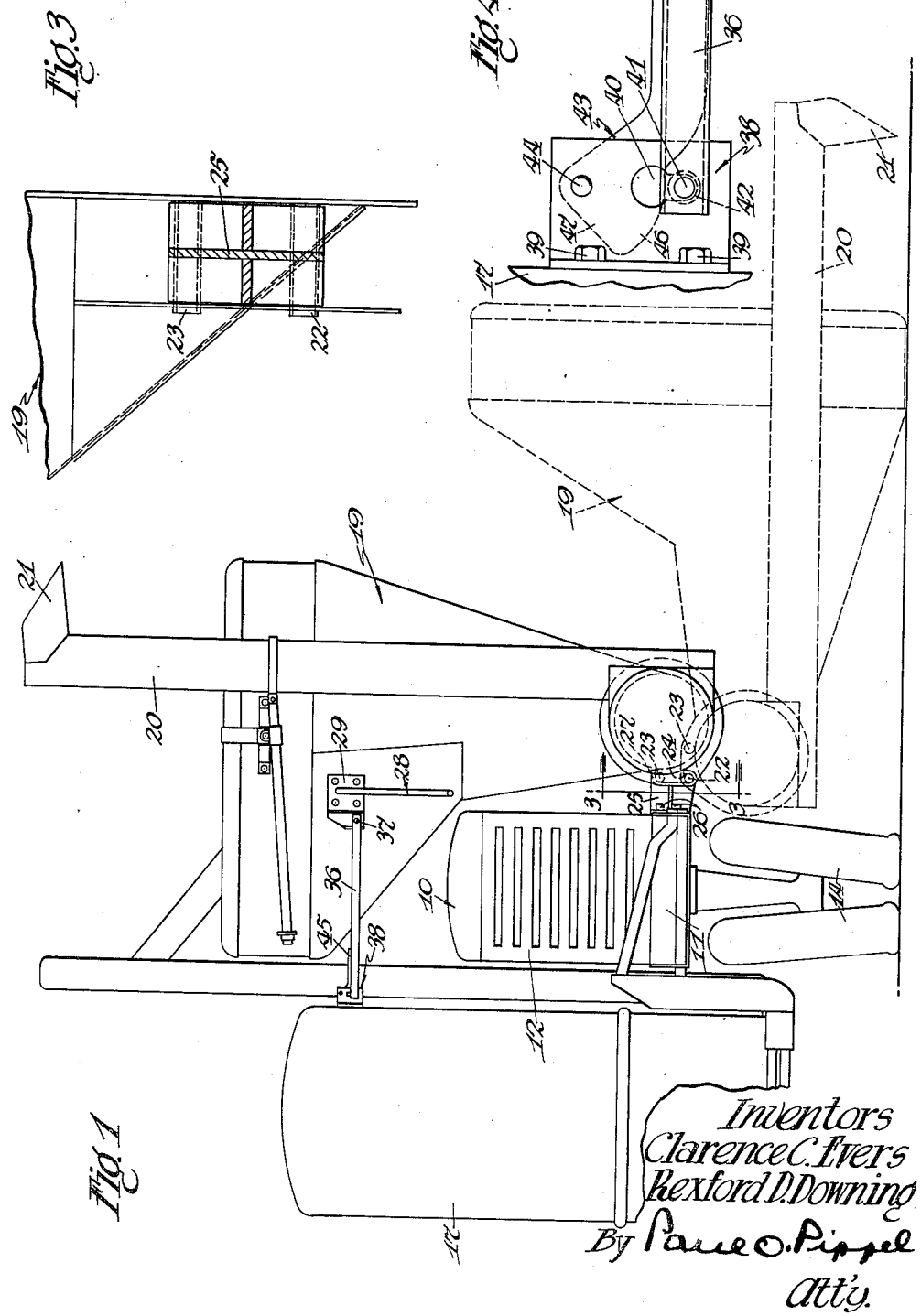

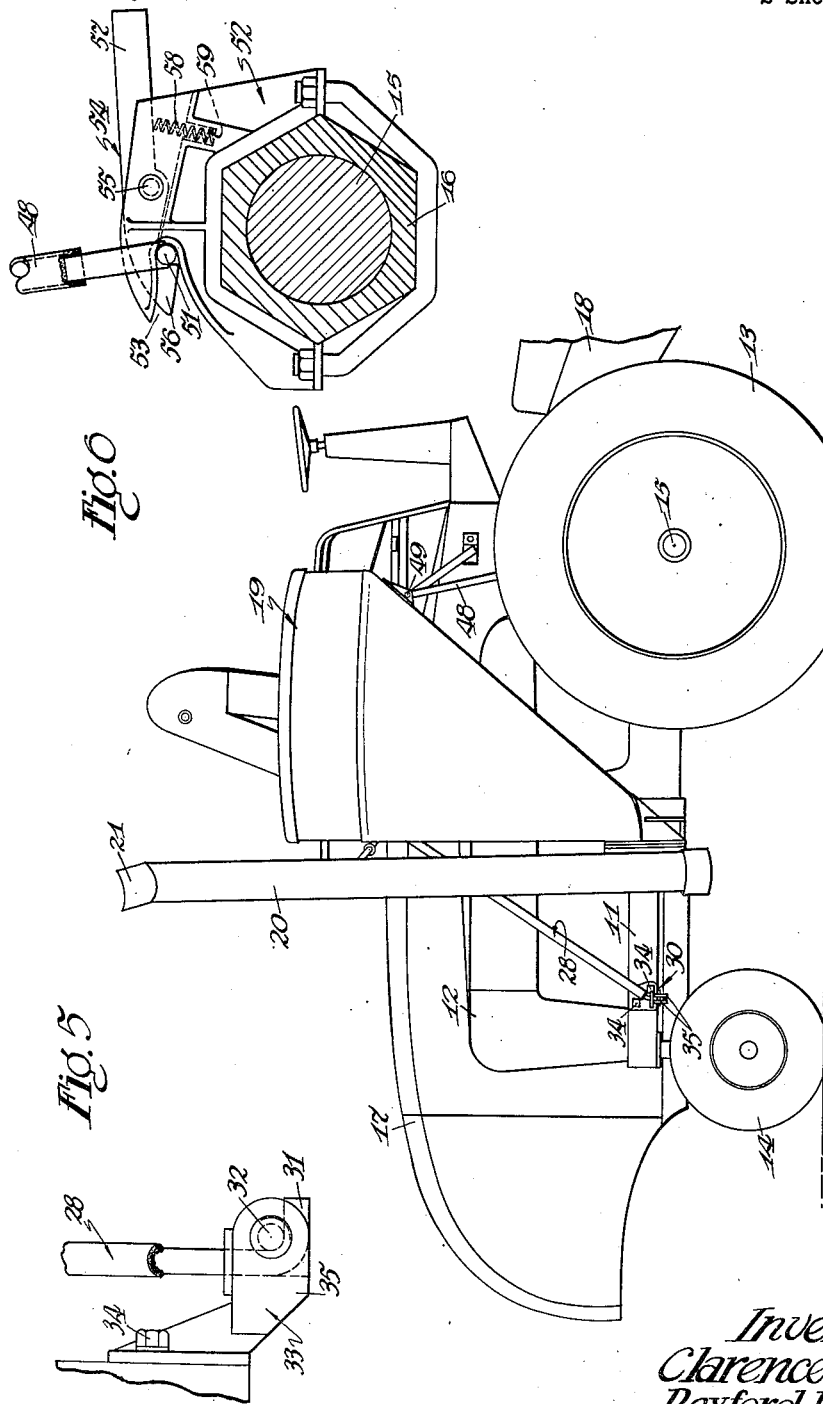

2,540,249

UNITED STATES PATENT OFFICE 2,540,249

GRAIN TANK ATTACHMENT

Clarence C. Evers, Davenport, Iowa, and Rexford D. Downing, Rock Island, Ill., assignors to International Harvester Company, a corporation of New Jersey Application May 31, 1946, Serial No. 673,586

2 Claims. (Cl. 248—1)

This invention relates to a new and improved grain tank attachment and has for one of its principal objects the provision of means for readily attaching a grain tank to a supporting structure such as a tractor or a harvester thresher.

An important object of this invention is to provide a simple means for mounting a grain tank on a tractor.

Another important object of the invention is to provide quick attachable means for a relatively large and heavy grain tank for use in conjunction with harvester threshers or the like.

A further important object of the invention lies in the mounting of a harvester thresher directly on one side of a tractor and in counterbalancing the weight of the harvester thresher by mounting a threshed grain receiving tank on the opposite side of the tractor and attached to the tractor and to the harvester thresher.

Another and further object of the invention is to provide a supporting structure adapted to receive a grain tank and both the supporting structure and the grain tank having complementary hinge means to permit the grain tank to be swung upwardly to a position substantially vertical with respect to the supporting structure and attaching means for holding the grain tank in its upper mounted position on the supporting structure.

Other and further important objects of this invention will become apparent from the disclosures in the following specification and accompanying drawings, in which:

Figure 1 is a front elevational view of a harvester thresher and grain tank mounted on a tractor.

Figure 2 is a side elevational view of the device as shown in Figure 1.

Figure 3 is a sectional view taken on the line 3—3 of Figure 1.

Figure 4 is an enlarged detail of the connection between the grain tank and the harvester thresher.

Figure 5 is an enlarged detail of another connection between the grain tank and the tractor.

Figure 6 is an enlarged sectional view showing the locking means of still another connection between the grain tank and the tractor.

As shown in the drawings:

The reference numeral 10 indicates generally a tractor or the like having a longitudinally extending narrow body portion 11, an engine 12, relatively widely spaced rear traction wheels 13, and small dirigible wheels 14 mounted beneath the forward end of the tricycle farm tractor. The rear traction wheels 13 are mounted on an axle 15, and as best shown in Figure 6 this rear axle 15 is surrounded by a hexagonal member 16 to facilitate clamping of implements therearound.

Numerous farm implements are capable of attachment to a farm tractor of the type shown and just described. Harvester threshers commonly called combines are usually pulled by a tractor rather than mounted directly on a tractor. Other forms of combines are of the self-propelled type which are equipped with engines for propelling the combine through the field as well as effecting operation of the harvesting and threshing mechanisms. There are several drawbacks in both types of combines, that is, the trail-behind and the self-propelled. In the trail-behind type, maneuverability is very limited and it is quite difficult to commence operation in a field of standing grain. In the self-propelled machines, maneuverability is increased, and it is relatively easy to start operations in a field. However, combining constitutes a relatively small portion of a farmer's work year, and for that reason it may be uneconomical to have a power plant tied up solely in a self-propelled combine. A combination of the two types of combines would seem to be the answer to the individual complaints against each type of machine. A combine directly mounted on a tractor and being easily removable therefrom produces a combine having good maneuverability, is capable of directly opening a field, and the expensive power plant is not tied up solely with this one machine. In other words, the tractor on which the combine is mounted may be used the year around for carrying and pulling other farm implements and machinery.

In order to make the harvester thresher easily attachable and detachable to and from the tractor, it has had to be considerably redesigned. A relatively long narrow separator or thresher device 17 has been placed alongside the narrow elongated tractor body over the rear axle and within the confines of the rear traction wheel 13 on that side of the tractor. In this tractor-mounted harvester thresher it has been found desirable to run the tractor in reverse direction so that the large traction wheels 13 are in fact the front of the machine. The harvester device is not completely shown in the drawing as it forms no part of the present invention. However, it is indicated by a partial showing of a platform 18 shown in Figure 2 and extending downwardly and forwardly from the axle 15 of the large traction wheels 13.

A grain-receiving tank ordinarily forms an integral part of the separator or the thresher body 17, but in the present machine the addition of a tank to the separator 17 would constitute so much weight on one side of the tricycle tractor that its operation would be quite dangerous. In view of this fact, attempts were made to attach the grain tank to the separator but with its weight carried substantially over the tractor engine. This materially interferes with the mounting of the combine. The grain tank 19 of this invention obviates the difficulties related above. In the present case a grain tank 19 is mounted on the side of the tractor 10 opposite the side on which the thresher unit 17 is mounted. This tends to properly distribute the weight on the tractor and prevents the tractor from becoming unstable.

The grain tank 19 is adapted for quick and easy attachment to the tractor. Further the attachment has been designed to be operated by one person. A grain tank on a harvester thresher must of necessity be relatively large to hold sufficient grain to be of any real value to the combine. For this reason the tank is quite heavy and unwieldly to handle. In Figure 1 the grain tank 19 of this invention is shown in dashed lines lying on the ground in a horizontal position. Associated with the tank 19 is a tank discharging elevator 20 which joins the bottom of the tank and which is provided with a discharging spout 21. When the tank is in a position on the ground such as shown in dashed lines in Figure 1, it is relatively easy to lift the lower end of the tank. In order to take advantage of this fact, spaced pins 22 and 23 are mounted on the tank in such a manner that the lower pin 22 is capable of being lifted into an upwardly open socket 24 on the side of the tractor body 11. The socket 24 is formed in a bracket-like member 25 bolted to the body 11 of the tractor at 26. Directly above the upwardly open socket 24 is a horizontally and outwardly extending flange 27 for reception of the upper pin 23 when the grain tank is swung to a substantially vertical operating position on the tractor pin. The upwardly open socket, in combination with the pin 22 on the grain tank, forms a hinge about which the grain tank may be swung. It is possible, therefore, for one man to place the pin 22 into the socket 24 and then subsequently lift the outer upper end of the grain tank to its full-line position as shown in Figure 1.

After the tank has been so raised various link members are attached to the tractor and to the separator on the opposite side of the tractor for holding the tank in its operating position. In order to make the hinging operation more positive, a fixed length connecting link 28 is attached to the upper part of the grain tank 19 at 29 and is adapted to be readily engaged to the tractor at 30 as shown in Figure 2. This connection is shown in detail in Figure 5. When the tank is on the ground the end 31 of the link 28 is bent at right angles thereto so that it may be hooked over a pin 32 mounted on the tractor 10. A bracket 33 is bolted to the tractor at 34 and carries spaced plate member 35 between which the pin 32 is positioned. When the hooked end 31 of the link 28 is positioned between the plate members 35 and hooked over the pin member 32, it forms an additional hinge cooperating with the hinge created by the elements 22 and 24 described above. The pin 32 is in horizontal axial alinement with the pin 22 so that both hinge members are operated together without causing distortion or twisting of any of the members. As the tank 19 is raised to its mounted position the upper pin member 23 nestles beneath the outwardly turned flange 27 of the bracket member 25, and the right angles end portion 31 of the link 28 turns down and under the pin member 32. In such position the link 28 cannot be removed from the bracket 33 without first turning the link 28 downwardly to the position it occupied when the tank 19 was on the ground.

As best shown in Figure 1, a tie or connecting link 36 is pivotally attached to the grain tank 37 and at its other end is removably attached to a bracket 38 bolted to the side of the separator 17 at 39 as shown in Figure 4. The bracket 38 is provided with a keyhole slot 40 within which a pin 41 on the end of the tie rod 36 is adapted to engage. The pin 41 is provided with an enlarged flange 42 small enough to go through the enlarged part of the keyhole slot but large enough to prevent withdrawal of the pin 41 through the restricted or small portion of the keyhole slot. The tie rod 36 has its pin 41 and flange 42 inserted through the large portion of the keyhole slot whereupon the rod is dropped downwardly so that the pin 41 is in the small portion of the keyhole slot 40. A lock member 43 is pivoted at 44 on the bracket 38 and is rotated by means of a handle 45. In the position as shown in Figure 4, a lower surface 46 of the lock member 43 prevents upward movement of the link 36 and thus maintains the tie rod or link 36 in locked position and the grain tank 19 and the separator 17 are fixedly tied together. Before removal of the link 36 may be effected, the lock member 43 must be swung upwardly about its pivot 44 so that the end surface 47 has proceeded past the keyhole slot 40 at which time the link 36 may be raised and removed from the enlarged end of this keyhole slot.

A fixed length attaching link 48 is pivotally attached at 49 to the grain tank 19 and is provided with a bent end 51 very similar to the connecting link 28 and its bent end portion 31. A bracket member 52 is clamped around the hexagonal axle housing 16 as shown in Figure 6 and is provided with an open socket 53 within which the bent end 51 is slidable. A lock member 54 is pivoted at 55 on the bracket 52 and has an overhanging end portion 56 which is adapted to hold the bent end 51 in its fixed position with respect to the bracket 52. A handle 57 on the end of the lock member 54 is adapted to be normally held in its uppermost or locking position by a spring 58 which is positioned between the handle 57 and a well 59 within the bracket 52. In order to release the connecting link 48 from its attached position with respect to the bracket 52 on the axle housing 16, the handle 57 is depressed against the action of the spring 58 whereupon the overhanging lip 56 is removed from the open socket 53 thus permitting a withdrawal of the bent end 51.

From the above description, it will be evident that the grain tank is provided with quick and easy attachable mechanism and that it is operable by a single person. All the attaching means are either automatically or quickly and easily operable. In the case of the attaching and hinging members which are shown in Figures 1, 2, and 5, the hinge attachments automatically lock themselves against removal without first lowering the grain tank. In the attachment of the connecting link as shown in Figure 4, the pivotable lock member 43 is merely raised and the link placed in position. Then the lock member is dropped causing the lower surface 46 to cover the large portion of the keyhole slot thus preventing removal of the connecting link 36. In the connection as shown in Figure 6, the bent end 51 of the link 48 is pushed into the open socket 53, and by reason of the inclined surface of the lower front end of the lock member 54, the lock member is raised merely by pushing in on the link member 48. When the bent end 51 reaches the inner end of the socket 52, an overhanging ledge 56 of the latch drops down making it impossible to remove the link 48 without preliminarily pushing down on the handle 57 of the lock member.

Numerous details of construction may be varied throughout a wide range without departing from the principles disclosed herein, and we therefore do not propose limiting the patent granted hereon otherwise than as necessitated by the appended claims.

What is claimed is:

1. For a tractor-mounted harvester comprising a vertically disposed grain tank having attaching means on the upper and lower ends thereof, cooperative attaching means on the tractor-mounted harvester, said attaching means and cooperative attaching means including a hinge means at the lower end of the grain tank and removable tie rods positioned between the upper end of the tank and the tractor-mounted harvester, said hinge means including vertically spaced rods on said tank and upwardly and laterally open sockets on said tractor for receiving said respective lower and upper spaced rods.

2. A device as set forth in claim 1 in which the device includes a rod member on the tractor longitudinally spaced and axially alined with the lower of said spaced rods, and one of said tie rods on the vertically disposed grain tank having a bent end portion adapted to be hooked over the rod member on the tractor.

CLARENCE C. EVERS.
REXFORD D. DOWNING.

REFERENCES CITED

The following references are of record in the file of this patent:

UNITED STATES PATENTS

| Number | Name | Date |
|---|---|---|
| 1,300,188 | Nelson | Apr. 8, 1919 |
| 1,594,535 | Lindbeck | Aug. 3, 1926 |
| 2,012,262 | Forsthoefel | Aug. 27, 1935 |
| 2,049,132 | Moxey | July 29, 1936 |
| 2,080,957 | Barnett | May 18, 1937 |
| 2,212,465 | Baldwin | Aug. 20, 1940 |
| 2,227,886 | Jungholm | Jan. 7, 1941 |
| 2,292,958 | Millard et al. | Aug. 11, 1942 |

FOREIGN PATENTS

| Number | Country | Date |
|---|---|---|
| 285,813 | Italy | May 23, 1931 |